United States Patent [19]

Shizuka et al.

[11] Patent Number: 4,506,180
[45] Date of Patent: Mar. 19, 1985

[54] FIXED FIELD INDUCTOR-TYPE GENERATOR

[75] Inventors: Masayuki Shizuka, Katsuta; Nobuhiko Ogasawara, Mito; Hisanobu Kanamaru; Kazuhiro Tsuruoka, both of Katsuta, all of Japan

[73] Assignee: Hitachi, Ltd., Tokyo, Japan

[21] Appl. No.: 464,941

[22] Filed: Feb. 8, 1983

[30] Foreign Application Priority Data

Feb. 8, 1982 [JP] Japan .................. 57-17530

[51] Int. Cl.³ .............................................. H02K 5/00
[52] U.S. Cl. .................................... 310/91; 310/42; 310/58; 310/71; 310/216; 310/263; 29/596
[58] Field of Search ............. 310/263, 91, 89, 156, 310/266, 166, 171, 168, 210, 165, 214, 194, 254, 257, 71, 58, 59, 216, 42, 67 R, 51, 208; 29/596

[56] References Cited

U.S. PATENT DOCUMENTS

| | | | |
|---|---|---|---|
| 2,073,760 | 3/1937 | Schou | 310/167 |
| 3,502,917 | 3/1970 | Bizoe | 310/71 |
| 3,610,979 | 10/1971 | Thomas | 310/263 |
| 4,041,340 | 9/1977 | Mrcun | 310/263 |

FOREIGN PATENT DOCUMENTS

| | | | |
|---|---|---|---|
| 2542011 | 5/1976 | Fed. Rep. of Germany | 310/263 |
| 20642 | 7/1979 | Japan | 310/91 |
| 158333 | 10/1962 | U.S.S.R. | 310/263 |
| 172903 | 7/1965 | U.S.S.R. | 310/263 |

*Primary Examiner*—R. Skudy
*Attorney, Agent, or Firm*—Antonelli, Terry & Wands

[57] ABSTRACT

In a fixed field inductor-type generator having an annular stator core on which an armature coil is wound and a field coil which is disposed stationary in said stator core, the field coil is located in space defined by a pair of rotatable pawl-like magnetic poles that are opposed to each other and are supported by a rotary shaft. The field coil is held by a holding member made of a non-magnetic metal, and is secured to the stator core. The field coil-holding member has fixed collars, which fastened to the inner peripheral surface of the stator core via a plastically deformable metallic coupling member. The field coil is wound on a curved spring steel plate and receives the expanding force at all times from the inner peripheral side thereof. The field coil is contained in the field coil-holding member and is firmly supported by an adhesive that is charged thereinto.

13 Claims, 8 Drawing Figures

FIXED FIELD INDUCTOR-TYPE GENERATOR

BACKGROUND OF THE INVENTION

The present invention relates to an inductor-type generator, and more specifically to a fixed field inductor-type generator having a fixed field coil construction suited for being mounted on a vehicle and to a method of producing the same.

Conventional inductor-type generators designed for use being mounted on vehicles can be grouped into those of the so-called rotary field type in which an exciting current is supplied to a field coil via slip rings, and those of the so-called fixed field type without brushes. In the fixed field inductor-type generator without brushes with which the present invention is concerned, a field coil is suspended in a space formed between poles of the rotor as disclosed, for example, in Japanese Patent Publication No. 20642/1979. When the generator is to be mounted on an automobile, in particular, it is required that the generator withstand a temperature of as high as about 180° C. from the engine and the vibration which is as intense as about 30 G. According to the above-mentioned conventional art, a holding member for holding the fixed field coil has a plurality of radially stretching legs which are inserted in coil-insertion grooves of the stator core, thereby to firmly hold the field coil. With the above-mentioned method, however, the armature coil is often damaged when the legs are inserted in the coil-insertion grooves, giving rise to the occurrence of dielectric breakdown, and the generator is assembled with poor efficiency.

According to the above-mentioned method, furthermore, the resin is poured into a relatively large clearance between the holding member and the field coil after the field coil has been incorporated in the coil-holding member that is secured in the stator core. Therefore, the strength for holding the field coil is reduced by the amount equal to the thickness of resin. When the generator is mounted on a motorcycle, in particular, the resin material is deteriorated, and the member holding the field coil loses strength quickly due to high temperatures and intense vibrations.

SUMMARY OF THE INVENTION

A first object of the present invention is to provide a fixed field inductor-type generator which is free from the above-mentioned defects inherent in the conventional art, and a method of producing the same.

Namely, the object of the present invention is to provide a construction for easily and reliably holding the field coil maintaining thermal and mechanical stability, and a method of producing the same.

A second object of the present invention is to provide an inductor-type generator having a construction which is capable of firmly securing the field coil.

The above-mentioned first object of the invention can be accomplished by forming a field coil-holding member suspended from the stator core using a nonmagnetic metal having a coefficient of expansion close to a coefficient of linear expansion of the stator core, and by securing outer peripheral portions of fixed collars of the holding member to the inner peripheral portion of the stator core via a nonmagnetic metal coupler.

The second object of the present invention can be accomplished by winding a field coil on a spring steel plate, sandwiching both ends of the spring steel plate between a pair of holding members and adhering them together using varnish or the like, in order to obtain a firm adhesive force between the field coil and the spring steel plate.

BRIEF DESCRIPTION OF THE DRAWINGS

FIG. 4 is an expansion plan of a spring steel plate employed for the fixed field coil of FIG. 3;

FIG. 5 is a perspective view showing, on an enlarged scale, a grommet used for the fixed field coil of FIG. 3;

FIG. 6 is a perspective view showing, on an enlarged scale, the coupling between the field coil and the stator core of the generator of FIG. 1;

FIG. 7 is a diagram which concretely illustrates how to effect the coupling of FIG. 6.

DESCRIPTION OF THE PREFERRED EMBODIMENTS

Figure 1:
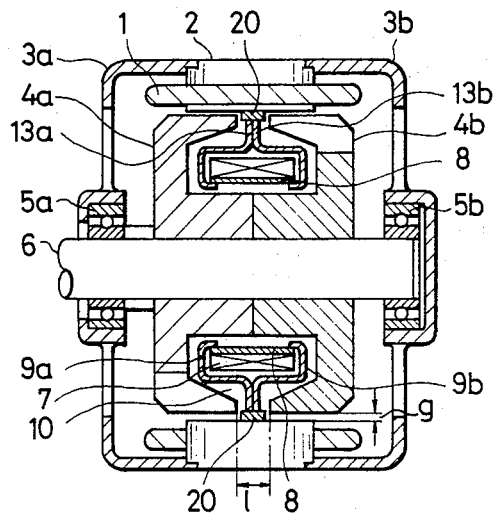
FIG. 1 is a section view illustrating a fixed field inductor-type generator according to an embodiment of the present invention.

FIG. 1 is a section view illustrating the whole setup of the embodiment of the invention, in which a stator core 2 on which an armature coil 1 is wound, is supported by end brackets 3a, 3b. Pawl-like magnetic poles 4a, 4b are secured to a rotary shaft 6 that is supported by the brackets 3a, 3b via bearings 5a, 5b, and are opposed to each other maintaining a suitable gap l. The laminated stator core 2 on which the armature coil 1 is wound is supported between the brackets 3a, 3b, and is opposed to the pawl-like magnetic poles 4a, 4b maintaining a gap g in the radial direction. An annular field coil 7 is suspended in annular space 10 defined by the pawl-like magnetic poles 4a, 4b.

Figure 2:
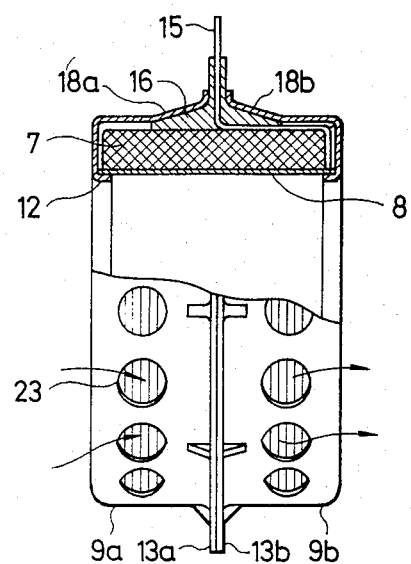
FIG. 2 is a partially cut-away side view illustrating a construction of a fixed field coil of the generator of FIG. 1.
Figure 3:
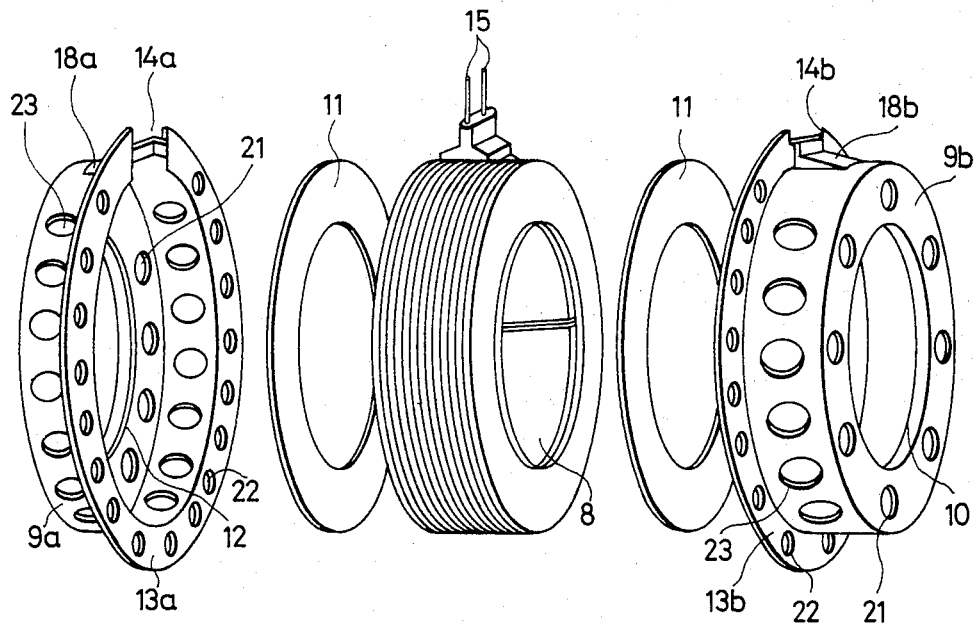
FIG. 3 is a perspective expansion plan of the fixed field coil of FIG. 2.
Figures 4, 5, 6, 7:
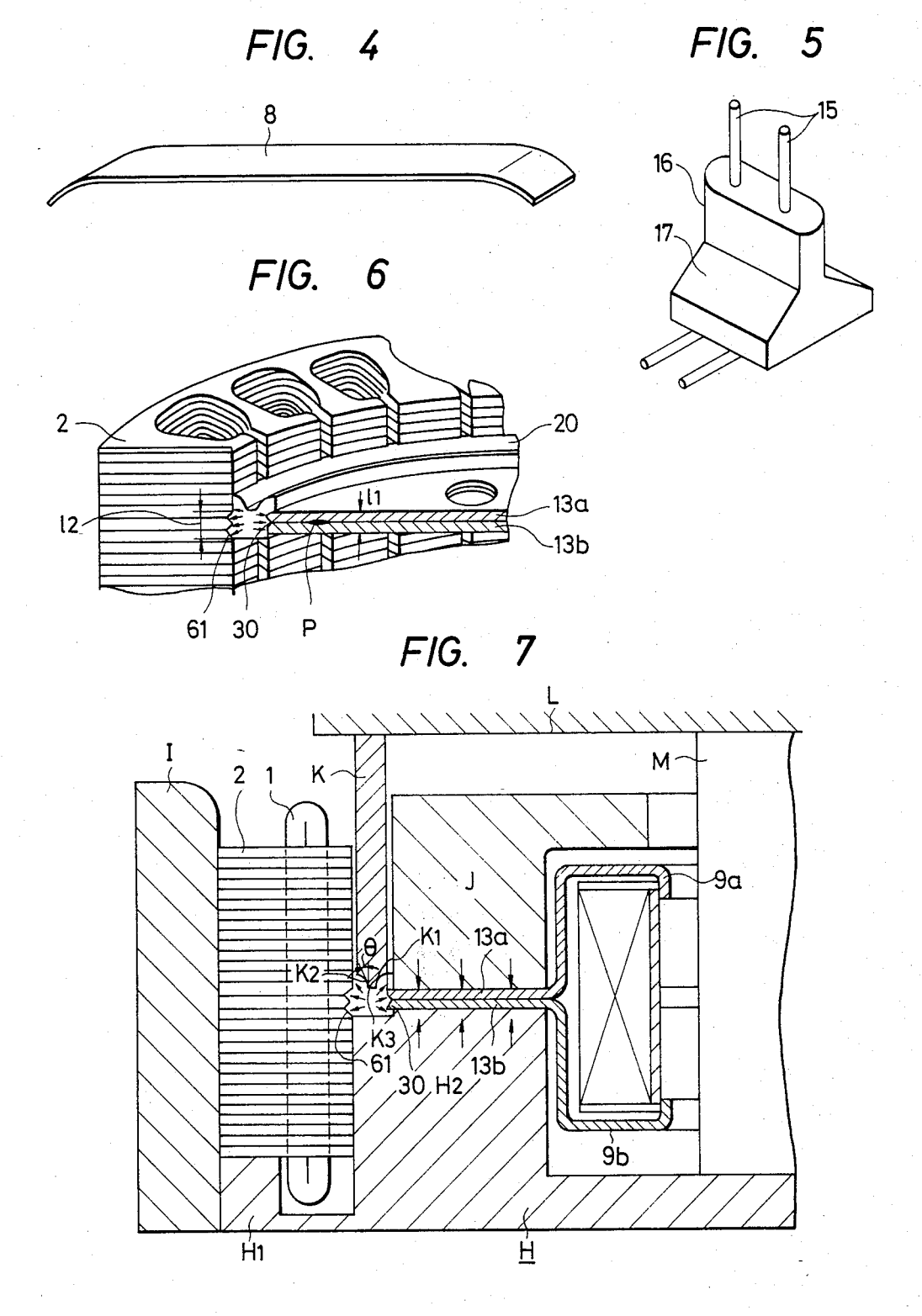

With reference to FIGS. 2 and 3, the field coil 7 is wound on a spring steel plate 8 which consists of a thin plate with its both ends being loosely bent as shown in FIG. 4. The spring steel plate 8 is wound on a winding fixture having a diameter D, and the field coil 7 is annularly wound thereon. Even when removed from the winding fixture, therefore, the field coil 7 is intimately contacted to the spring steel plate 8 owing to the resilient force of spring steel plate 8. The field coil is covered with insulation papers 11, and is further sandwiched by a pair of cup-shaped coil-holding members 9a, 9b made of a nonmagnetic metal such as stainless steel. The holding members 9a, 9b are produced by press-working a stainless steel plate. Edges of the cylindrical space at the center of holding members 9a, 9b are folded as denoted by 12, and both ends of the spring steel plate 8 are forcibly fitted to the periphery thereof. Collars 13a, 13b that serve as abutting surfaces of the coil-holding portions 9a, 9b are coupled together by welding or riveting. The collars 13a, 13b are equipped with cut-away portions 14a, 14b through which lead wires 15 of the field coil 7 will be drawn. A grommet 16 of the shape shown in FIG. 5 is used to protect the lead wires 15. By fitting a tapered portion 17 of grommet 16 to tapered protruberances 18a, 18b of the holding members 9a, 9b, the lead wires 15 can be held in position. In the fixed field coil assembled as shown in FIG. 2, collars of the holding members 9a, 9b are firmly fastened to the inner periphery of the stator core 2 via a metal coupling member 20 by the plastic coupling method which will be described later in detail. Under this condition, varnish is applied to the armature coil 1 and to the field coil 7 simultaneously. Holes 21, 22, 23 are formed in the surfaces of the holding members 9a, 9b. The varnish enters through, for example, the holes 21 into the holding members 9a, 9b, and reaches the clearance between the field coil 7 and the holding members 9a, 9b, and contacting surfaces between the field coil 7 and the spring steel plate 8, thereby to adhere them together. Thus, the spring steel plate 8 and the field coil 7 are intimately contacted together maintaining increased strength. It is desired that the adhesive be applied under vacuum condition, so that good adhesion is realized. The spring steel plate 8 is forcibly fitted to the edges of holding members 9a, 9b, which are fastened to the inner peripheral portion of the armature core 2 by the plastic coupling method. Therefore, the field coil 7 can be firmly secured. Holes 22, 23 formed in the holding members 9a, 9b serve as ventilation holes. The air introduced through the holes of one side passes through the space and are permitted to escape through the holes of the other side as indicated by arrows in FIG. 2. Lead wires 15 of the field coil 7 passes through a slot in the stationary core 2 and run up to the end portion of the armature coil 1, and are connected to the externally leading wires.

According to the embodiment of the present invention, the following effects can be obtained in addition to that the field coil 7 is firmly supported.

(1) Assembling operation can be performed efficiently since no resin is poured to hold the field coil 7. The step for electric insulation can be eliminated since varnish is applied to the armature coil and to the field coil, simultaneously.

(2) The field coil can be cooled efficiently since the cooling air is directly blown onto the surface of the field coil.

In the above-mentioned embodiment, enameled wire is usually used to form the field coil. In this case, the holding member is not required if the enameled wire is of the type which adheres together by melting. Moreover, an adhesive sheet may be stuck after the enameled wire has been wound followed by heating by supplying the electric current.

The thus assembled fixed field coil is secured by the plastic coupling method by fastening collars of the holding members 9a, 9b to the inner periphery of the stator core 2 via the third metal member 20. The coupled state is described below in detail with reference to FIG. 6, in which a V-shaped groove 30 is formed throughout the circumference of collars 13a, 13b of the housing members 9a, 9b, and a W-shaped groove 61 is formed throughout the inner periphery of the stator core 2. The above-mentioned two members are firmly coupled together via a metallic coupling member 20. Width $l_2$ of the W-shaped groove is nearly equal to the thickness $l_1$ of the fixed collars 13a and 13b.

The step of combination will be described below in conjunction with FIG. 7. The laminated stator core 2 on which the armature coil 1 is wound has the W-shaped groove 61 of an angle of 90 degrees in the center of its inner periphery, and is mounted on a receiving mold H which has a receiving surface $H_1$ for receiving the stator core and a receiving surface $H_2$ for receiving fixed collars of the field portion. The outer periphery of the stator core is fitted in an outer mold I. Fixed collars 13a, 13b of the pair of field coil-holding members 9a, 9b combined together are placed on the receiving surface $H_2$, and are compressed by a pushing mold J so as not to move in the radial direction. Under this condition, outer junction surface of the fixed collars 13a, 13b is opposed nearly onto the central line of the W-shaped groove 61. Then, the annular metallic coupling member 20 is inserted in the space formed between the stator core 2 and the collars 13a, 13b. The bottom surface of the coupling member 20 is received by a portion of the fixed collar-receiving $H_2$, and is pressed from the upper direction using a cylindrical punch K while preventing it from being moved frontwardly or toward the circumferential direction. The punch K has a protruded surface $K_1$ at its end so as to press the portions of the annular coupling member 20 nearly along the center thereof. Protruded side surface $K_2$ of the punch is tilted by an angle $\theta$ relative to the direction (inserting direction) which is perpendicular to the end surface $K_3$. The angle $\theta$ should desirably be from 6° to 15°. This is because, if the angle $\theta$ is too small, the punch which is driven into the coupling member will be removed with difficulty. If the angle $\theta$ is too great, on the other hand, the coupling member may tend to move in the direction opposite to the direction in which the punch is driven, i.e., the coupling member may escape from the gap. Moreover, the punch cannot be deeply driven, and large internal stress cannot be generated in the coupling member, making it difficult to obtain a large coupling force.

If the punch K is lowered and is driven by about 0.5 to 0.8 mm up to the end surface of the W-shaped groove 61 (nearly equal to the upper surface of the collar 13a), the metallic coupling member 20 plastically flows into the W-shaped groove 61 and the V-shaped groove 30. Even after the punch K is removed, therefore, a required tension is left in the coupling member 20. The tension so works that fixed collars 13a, 13b of the field coil-holding members are firmly held by the stator core 2. The punch K can be driven until the punch-mounting plate L comes into contact with a stopper M which defines the depth for driving the punch.

In the thus constructed field coil 7, the coupling member 20 is made of a copper material ring having a coefficient of linear expansion that is about 1.5 times as great at that of the stator core, and fixed collars 13a, 13b of the coil-holding members are made of a stainless steel plate having a coefficient of thermal expansion which is nearly equal to that of the stator core 2. Therefore, thermal distortion does not take place in the W-shaped groove 61 at low and high temperatures. Further, since the coupling member 20 is disposed maintaining tension, coupling is not loosened between the coupling member 20 and the members being coupled (stator core 2 and fixed collars 13a, 13b). Therefore, resistance is remarkably improved against vibration. Although copper is used as the coupling member 20 in the above-mentioned embodiment, comparable effects can be obtained even when aluminum or brass is used as the coupling member provided it has a coefficient of linear expansion which is as great as from about 1.5 to 2.0 times as great as that of iron.

In this embodiment, furthermore, the coil-holding members (fixed collars 13a, 13b) are fastened to the inner periphery of the stator core 2 via the coupling member 20 which is deformed by the pressing. Accordingly, no pressure is exerted on the armature coil 1; i.e., the coil is not damaged. Furthermore, the coupling operation can be accomplished through a simple press-working, enabling the productivity to be greatly increased. Coupling strength in the rotational direction increases, too, since the plastically deformed coupling member flows into the coil slots to some extent.

In the above-mentioned embodiment, W-shaped groove 61 and V-shaped groove 30 are formed in the inner periphery of the stator core 2 and in the circumference of collars. Instead of forming the V-shaped groove in the circumference of the collars 13a and 13b, it is also allowable to utilize the broken or uneven surface produced in the punching direction along the circumference of the collar when the collars are punched, such that circumference of the abutting circumferential collar surfaces will serve as a recess.

Figure 8:
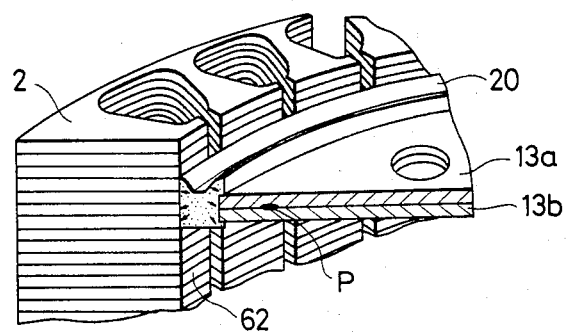
FIG. 8 is a perspective view showing, on an enlarged scale, a portion of another coupling method which is different from the coupling method of FIG. 6.

FIG. 8 illustrates another embodiment in which the coarse surface 62 of laminated steel plates of the stator core 2 is directly utilized as the inner periphery, and the opposing circumference of the collars 13a and 13b is not particularly machined, but its broken or uneven surface is effectively utilized. Even in this case, the coil-holding members effectively work in a stationary inductor-type generator.

Further, although collars of two coil-holding members are abutted together, even a single coil-holding member may fulfill the object of the invention. Moreover, though the above-mentioned embodiment has illustrated the construction in which both ends of the rotary shaft are supported, the present invention is particularly effective for the generators of the type which are directly coupled to the engine, such as generators mounted on motorcycles in which the rotary shaft is directly coupled to the crank shaft, and the brackets are directly fastened to the crank case. Namely, the generator constructed according to the present invention exhibits excellent resistance against the vibration, heat and impact.

What is claimed is:

1. An inductor-type generator comprising:
   an annular stator core on which an armature coil is wound;
   a pair of pawl-like magnetic poles opposed to the inner peripheral surface of said stator core with a gap therebetween, the pair of pawl-like magnetic poles being firmly held by a rotary shaft;
   a field coil located in a space formed between said pair of pawl-like magnetic poles and secured to the inner peripheral surface of said stator core; and
   holding means for holding said field coil therein to position said field coil within the space formed between said pair of pawl-like magnetic poles and for securing said field coil on the inner peripheral surface of said stator core;
   wherein said field coil-holding means includes a holding member with a radially extending collar, said collar having circumferential portions opposed to the inner peripheral surface of said stator core with a uniform space therebetween, said holding member being made of a nonmagnetic metal having a coefficient of linear expansion close to that of said stator core, and a plastically deformable nonmagnetic metallic coupling member disposed in tension of the space between the peripheral surface of said annular stator core and said circumferential portions of said holding member for securing said field coil-holding member to the inner peripheral surface of said stator core.

2. An inductor-type generator according to claim 1, wherein the holding member comprises two nonmagnetic metallic members each having a respective radially extending collar joined together with the circumferential portions of the respective joined collars having uneven surface portions for receiving the plastically deformed coupling member.

3. An inductor-type generator according to claim 1, wherein a groove is formed throughout the inner peripheral surface of the stator core, the nonmagnetic coupling member being plastically deformed into said groove.

4. An inductor-type generator according to claim 1, wherein the nonmagnetic metallic coupling member comprises a copper ring.

5. An inductor-type generator according to claim 3, wherein the groove formed throughout the inner peripheral surface of the stator core has a W-shape.

6. An inductor-type generator according to claim 1, wherein said field coil is firmly supported by the holding member which covers the side surface and peripheral surface of said field coil and which is secured to the stator core, said field coil is firmly supported by a resilient plate which is disposed at the inner peripheral surface of the field coil to produce a force of expansion, and said field coil is firmly supported by an adhesive disposed therein.

7. An inductor-type generator according to claim 6, wherein said coil-holding member consists of a pair of substantially cup-shaped nonmagnetic metallic member having abutting surfaces, and each of said nonmagnetic metallic members has an edge portion which protrudes toward the field coil to come into engagement with said resilient plate.

8. An inductor-type generator according to claim 6, wherein said resilient plate consists of a spring steel plate.

9. An inductor-type generator according to claim 6, wherein the radius side of said holding member is opposed to the field coil maintaining clearance, and a plurality of ventilation holes are formed in both sides of the holding member with the middle point in the axial direction as a center.

10. An inductor-type generator according to claim 6, wherein said holding member is provided with a grommet for holding lead wires of said field coil.

11. An inductor-type generator according to claim 1, wherein said field holding member comprises two nonmagnetic metallic members each having a respective radially extending collar joined together so that the circumferential portions of the respective joined collars form a V-shaped groove.

12. An inductor-type generator according to claim 11, wherein a W-shaped groove is formed along the inner peripheral surface of the stator core, the W-shaped groove having a width corresponding to the thickness of the joined collars of the field holding member, the nonmagnetic coupling member being plastically deformed into the W-shaped groove of the inner peripheral surface of the stator core and the V-shaped groove of the field holding member so as to secure the field coil on the inner peripheral surface of the stator core.

13. An inductor-type generator according to claim 1, wherein the nonmagnetic metallic coupling member has a coefficient of linear expansion of about 1.5 times the coefficient of linear expansion of the stator core.

* * * * *